US011323016B2

(12) United States Patent
Ravaud

(10) Patent No.: US 11,323,016 B2
(45) Date of Patent: May 3, 2022

(54) UNITARY MAGNET HAVING AN OVOID CONFIGURATION, AND MAGNET STRUCTURE COMPRISING MULTIPLE UNITARY MAGNETS

(71) Applicant: Whylot SAS, Cambes (FR)

(72) Inventor: Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 116 days.

(21) Appl. No.: 16/769,181

(22) PCT Filed: Jan. 18, 2019

(86) PCT No.: PCT/IB2019/050420
§ 371 (c)(1),
(2) Date: Jun. 2, 2020

(87) PCT Pub. No.: WO2019/145831
PCT Pub. Date: Aug. 1, 2019

(65) Prior Publication Data
US 2021/0218290 A1    Jul. 15, 2021

(30) Foreign Application Priority Data
Jan. 26, 2018   (FR) ..................................... 1800086

(51) Int. Cl.
*H02K 41/03* (2006.01)
*H01F 7/02* (2006.01)
(Continued)

(52) U.S. Cl.
CPC ........... *H02K 41/031* (2013.01); *H01F 7/021* (2013.01); *H01F 41/0253* (2013.01); *H02K 1/02* (2013.01); *H02K 1/2793* (2013.01); *H02K 21/24* (2013.01)

(58) Field of Classification Search
CPC ...... H02K 41/031; H02K 1/02; H02K 1/2793; H02K 21/24; H01F 7/021; H01F 41/0253; H01F 7/02; H01F 7/0221; H01F 7/0231
See application file for complete search history.

(56) References Cited

U.S. PATENT DOCUMENTS

| 4,555,685 A | 11/1985 | Maruyama |
| 2004/0263012 A1 | 12/2004 | Dommsch et al. |

(Continued)

FOREIGN PATENT DOCUMENTS

| EP | 2306619 A2 * | 4/2011 | ........... H01F 1/0536 |
| EP | 3125405 A1 * | 2/2017 | ........... G01R 33/383 |

(Continued)

OTHER PUBLICATIONS

International Search Report dated May 17, 2019 from IA PCT/IB2019/050420.

*Primary Examiner* — Mohamad A Musleh
(74) *Attorney, Agent, or Firm* — Crockett & Crockett, PC; K. David Crockett, Esq.

(57) ABSTRACT

The invention relates to a unitary magnet (1) that has an elongate shape and an at least partially ovoid contour as the unitary magnet (1) comprises a first portion (1a) forming a body of the unitary magnet (1) that has a larger cross-section and extends over a greater portion of the length of the unitary magnet (1) than at least one second longitudinal end portion (1b) that points towards an associated longitudinal end of the magnet and has a decreasing cross-section towards the longitudinal end.

15 Claims, 2 Drawing Sheets

(51) Int. Cl.
*H01F 41/02* (2006.01)
*H02K 1/02* (2006.01)
*H02K 1/2793* (2022.01)
*H02K 21/24* (2006.01)

(56) References Cited

U.S. PATENT DOCUMENTS

2011/0080065 A1 4/2011 Watanabe et al.
2013/0181565 A1* 7/2013 Petro ................ H02K 15/022
                                                    310/156.33

FOREIGN PATENT DOCUMENTS

| FR | 733513 | 7/1955 | | |
| FR | 3031848 | 7/2016 | | |
| FR | 3086465 A1 * | 3/2020 | ............... | H02K 1/02 |
| WO | WO-2012141932 A2 * | 10/2012 | ........... | H01F 7/0205 |
| WO | WO2017098094 | 6/2017 | | |

\* cited by examiner

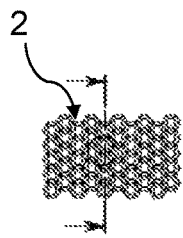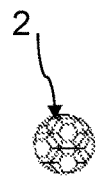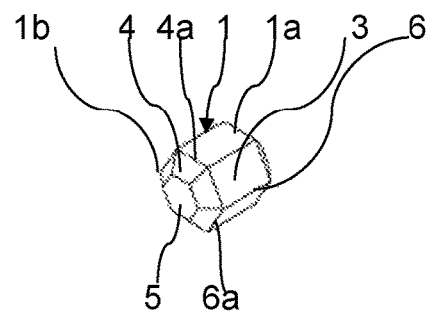
FIG.1a  FIG.1b  FIG.1c
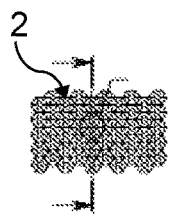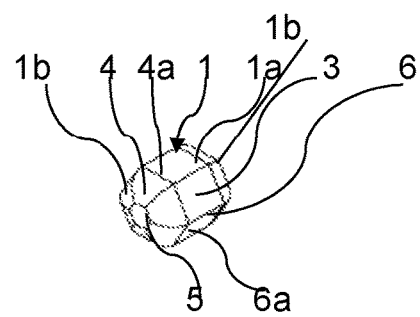
FIG.2a  FIG.2b  FIG.2c
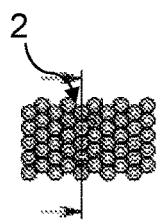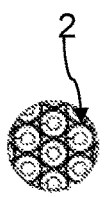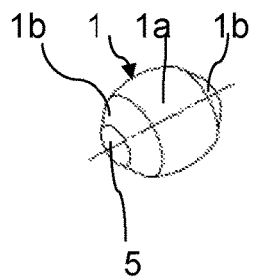
FIG.3a  FIG.3b  FIG.3c

UNITARY MAGNET HAVING AN OVOID CONFIGURATION, AND MAGNET STRUCTURE COMPRISING MULTIPLE UNITARY MAGNETS

FIELD OF THE INVENTIONS

The present invention relates to a unitary magnet having a partly ovoid configuration and a magnet structure with a plurality of unitary magnets. The invention further relates to an electromagnetic actuator comprising one or more such magnet structures.

BACKGROUND

The present invention has an advantageous but not restrictive application for an electromagnetic actuator that outputs high power with a high speed of rotation of the rotor, which is achieved by the use of one or more magnet structures according to the present invention. An electromagnetic actuator of this type can be used, for example, in a fully electric or hybrid automotive vehicle.

Advantageously but not restrictively, the actuator can be a rotary actuator that can comprise at least one rotor framed by two stators, whereby these elements can be superimposed on one another and can be separated by at least one air gap on the same shaft.

In high-speed applications, is necessary to have not only a compact system made possible by the reduction of the weight and size of the electromagnetic actuator for an optimal output but also very high mechanical strength of the part in rotation or translation, i.e. the rotor or the elements in linear translation, to improve the reliability of the system.

In high-speed applications, it is necessary to reduce losses to achieve optimal output. Miniaturization is an increasingly sought-after objective in automobile applications. To achieve that, it is important to have a compact system made possible by the reduction of the weight and size of the actuator as well as very high mechanical strength of the moving part to improve the reliability of the system.

For an electromagnetic actuator with axial flux, as one nonrestrictive example of the present invention, the rotor comprises a body in the form of a disk having two circular faces connected by a thickness, the disc being delimited between an external rim and an internal periphery that defines the edge of a cavity for a rotating shaft.

At least two permanent magnets are applied against at least one of the two circular faces of the body called the support face. For a rotor with a single air gap designed to be associated with a stator, a single circular face of the body carries the magnets while, for a rotor with two air gaps with a respective stator, it is the two faces that carry the magnets.

The magnets are each held on the face or on their respective face by retention means, a space being left between the at least two magnets on a given face.

For an electromagnetic actuator with radial flux, the rotor comprises a cylindrical body, the entire periphery of which carries magnets.

Each stator of each of the stators has winding elements comprising a tooth with a winding, the tooth being framed on each of its sides by a notch, a metallic wire made of a highly conductive material which is wound around the tooth to form a winding.

When electricity is fed to the series or series of windings, the rotor which is fastened to the output shaft of the motor is subjected to a torque resulting from the magnetic field, the magnetic flux created being an axial flux for an axial flux electromagnetic machine and a radial flux for a radial flux machine.

It is known that magnets can be demagnetized when they are subjected to high temperatures.

US-A-2011/080065 describes a rotor for an axial flux motor with a plurality of magnet structures arranged around the rotor and composed of a plurality of unitary magnets.

The rotor described in this document is based on the finding that the permanent magnets in the motor of this type are exposed to a high temperature on account of the heat generated by the windings and have a non-negligible probability of demagnetization by the demagnetizing field of the windings. Thus there is a demand for magnets in which the coercive force, which is an index of high-temperature strength and resistance to demagnetization, is above a certain level.

When the rotor rotates, Foucault currents circulate in the magnets. Effective means to reduce the Foucault currents consist of dividing a magnetic body to interrupt the path of the Foucault current. Although the division of a magnet body into smaller pieces leads to a greater reduction of losses resulting from Foucault currents, it becomes necessary to take into consideration problems such as an increase in the cost of manufacture and a decrease in output.

This prior art document teaches that each of the divided unitary magnets has a coercive force close to the surface of the magnet part that is greater than the coercive force in the interior of the unitary magnet. This is a difficult and expensive measure to implement.

Moreover, in this prior art document the unitary magnets are adhesively connected face to face, whereby they are in the form of cubes which contributes to their demagnetization and does not allow an exchange of heat with the exterior of the magnets.

GB-A-733 513 describes a unitary magnet comprising a more or less straight cylindrical first portion forming the body of the unitary magnet that has a larger cross-section and extends over a greater length of the unitary magnets then at least a second longitudinal end portion pointing toward an associated longitudinal extremity of the magnets, whereby the cross-section decreases as it approaches the longitudinal extremity.

This prior art document is relative to a unitary magnet housed in a ballpoint pen and not to a unitary magnet that is grouped with other unitary magnets to form a magnet structure combining all the unitary magnets.

U.S. Pat. No. 4,555,685 is relative to large magnets. These large magnets have a trapezoidal shape but they are not connected to one another to form a compact magnet structure.

US-A-2004263012 describes large magnets that are therefore similar to magnet structures. These large magnets have beveled edges but they are not combined with one another to form a compact magnet structure.

SUMMARY

The problem addressed by the present invention is to design a form of unitary magnet and a magnet structure combining a plurality of unitary magnets that can counteract demagnetization of the unitary magnet while allowing a strong fastening of unitary magnets among one another when these unitary magnets form the magnetic structure that can withstand high speeds of operation while supplying a powerful magnetic field with an optimal retention of the magnets in their support.

For this purpose the present invention relates to a magnet structure in three dimensions constituted by a plurality of unitary magnets, characterized in that the unitary magnets are in the shape of an elongated ellipsoid of revolution or polygon, with each unitary magnet comprising a first portion that forms the body of the unitary magnet having a larger cross-section and extending over a greater length of the unitary magnet than at least a second longitudinal end portion pointing toward an associated longitudinal extremity of the magnet, the cross-section of which decreases as it approaches the longitudinal extremity, the unitary magnets being directly adjacent to one another and in partial contact, the magnets being adhesively fastened by the application of adhesive in the areas of the unitary magnets in contact, the plurality of unitary magnets creating a mesh structure of magnets without the interposition of retention elements other than the adhesive between them.

Considering a unitary magnet as an elementary element in the form of a block, the ideal shape of this block is a symmetrical ellipsoid of revolution, also called an ovoid shape, approximately a flattened sphere, which on account of its topology is difficult to demagnetize because its magnetic field relative to the magnetization is shapeless. There is no rotating field in its corners. Based on this discovery, the inventive step of the present invention is to constitute a mesh structure of unitary magnets that comes as close as possible to an ellipsoid of revolution.

Several embodiments are possible and the ovoid shape of the unitary magnet can be more or less perfect, having an end portion with a convex rounded shape on one or both longitudinal extremities.

A relatively perfect ovoid shape with two longitudinal extremities in a convex shape is optimal but difficult to obtain by machining. On the other hand, it is the ideal shape to counteract a demagnetization of the unitary magnet.

As an alternative, a unitary magnet based on a poly-faceted structure with a first portion called the body with longitudinal facets and at least one end portion with facets inclined at angles of between 0 and 45° can also be considered, making it possible to increase the magnetic field relative to the magnetization while preserving the large active surfaces on the extremities of the unitary magnets in the form of blocks.

Between these two embodiments, numerous other shapes more or less approximating an ovoid shape are also possible.

Unitary magnets are thus obtained in the form of "crystals" associated with one another and which are not connected over the entire surface area of the facets or longitudinal surfaces, although coatings of resin and adhesive are substituted on the large base of the 45° facets and on the longitudinal facets advantageously provided with beveled edges to construct a mesh network on the extremities of the poly-faceted blocks with areas of contact between adjacent magnets.

For unitary magnets with a perfect ovoid shape with a rounded first portion, the contact between two adjacent unitary magnets is smaller and can be only spot contact and corresponds essentially to a small circular arc between two unitary magnets. A strip the size of the contact circular arc between two adjacent unitary magnets can be hollowed out to receive the adhesive, which is advantageously in the form of resin.

The unitary magnets are not bonded on their lateral surfaces, at most on the facets or edges of facets. Coatings of resin and adhesive are substituted, for example, on the large base of the 45° facets and on the longitudinal facets advantageously provided with beveled edges to construct a mesh network on the extremities of the poly-faceted blocks.

Advantageously, the at least one second longitudinal end portion is rounded into a convex shape, one crown of the convex shape forming the associated longitudinal extremity. The result is a perfectly shaped extremity of an ovoid.

The at least one second longitudinal end portion advantageously has on its crown a median facet forming the longitudinal extremity. This forms a beveled edge or a truncated or flattened peak on the end of the longitudinal extremity.

The at least one second longitudinal end portion advantageously comprises lateral facets inclined toward a longitudinal axis of the magnet approaching the associated longitudinal extremity of the magnet, the inclined lateral facets extending between a large base connected to the first portion forming the body of the magnet and a small base forming a longitudinal extremity of the magnet. In this embodiment, the second end portion is constituted by inclined facets.

The inclined lateral facets are advantageously rounded to make them convex. This makes it possible to approximate a perfect ovoid shape for one or both longitudinal extremities.

The longitudinal extremity of the magnet advantageously comprises a median facet surrounded by inclined lateral facets. The longitudinal extremity or the longitudinal extremities of the unitary magnets are then beveled.

Each longitudinal end portion of the magnets advantageously comprises a second longitudinal end portion. This completes the ovoid shape on the two longitudinal extremities and contributes to a better resistance to demagnetization, in particular in the case of a unitary magnet in the form of a perfect ovoid.

The first portion forming the body of the unitary magnet having a larger cross-section and extending over a greater length of the unitary magnet is advantageously rounded and has its largest cross-section toward a longitudinal median portion of the magnet and has a decreasing cross-section toward the longitudinal extremities of the magnet. This is an alternative to a polygonal first portion comprising facets or a first portion that has a cylindrical shape.

The first portion forming the body of the unitary magnet is advantageously in the shape of a polygon having longitudinal facets or a cylindrical shape with a circular or ovalized cross-section. The first portion forming the body of the unitary magnet is not rounded in this case and does not tend toward a perfect ovoid shape.

Advantageously, the first portion having longitudinal facets, each of the inclined lateral facets of the at least one second portion is longitudinally extended on the unitary magnet by a longitudinal facet of the first portion.

Advantageously, the areas of unitary magnets that are in contact have bevels hollowed out in an exterior contour of each unitary magnet in contact with another unitary magnet, the adhesive being deposited exclusively on the beveled edges of the unitary magnets. There can be longitudinal bevels on the unitary magnet and transverse bevels on the unitary magnet over at least a portion of a contour of the magnet centered on a longitudinal axis of the unitary magnet.

The invention further relates to a linear or rotary electromagnetic actuator, characterized in that it comprises a magnet structure of the type described above or a plurality of such magnet structures, the magnet structure or structures forming part of a rotor that rotates around its center, the magnet structure or structures being arranged concentrically with respect to the center of the rotor.

When unitary, the magnet structure advantageously forms a single magnet extending around the actuator or, when there are multiple magnets, the magnet structures are successive blocks forming successive alternating magnetic poles.

Finally, the invention relates to a method for the fabrication of a magnet structure of the type described above, characterized in that it comprises the following steps:

cutting out from a magnetized tile having a length, a width and a thickness forming three dimensions of the tile, a plurality of unitary magnets according to the three dimensions of the magnetized tile, the unitary magnets having at least partly an ovoid shape, determination of partial contact areas on each unitary magnet with each magnet that is adjacent to it when the magnets are adjacent to one another, adhesive connection of each unitary magnet by deposition of a resin for each unitary magnet only in determined partial contact areas, positioning of the unitary magnets thus adhesively connected adjacent to one another, a partial contact between two adjacent unitary magnets being established in the contact areas.

The method on which the present invention is based is therefore that the cohesiveness among the unitary magnets is achieved without the need for a mesh structure in which the unitary magnets are individually housed, which represents a saving of space and makes it possible to house more unitary magnets in each magnet structure.

Moreover, there is no longer any face-to-face contact of the unitary magnets as proposed by the prior art, but an essentially spot contact, linear contact or contact in the form of a circular arc, which makes it possible to increase the magnetic field relative to the magnetization and eliminate the need to dope the magnets while preventing elementary Foucault currents. It is therefore possible to have a very large total number of unitary magnets in a magnet structure, for example on the order of 200 to 300 unitary magnets per magnet structure.

Ultimately, it is possible to consider unitary magnets adopting different configurations tending more or less toward a perfect ovoid shape.

Advantageously, there is an injection of a coating of composite around the unitary magnets thus placed in contact and adhesively connected for their coating. This makes it possible to obtain a compact magnet structure while filling in the spaces between the unitary magnets.

BRIEF DESCRIPTION OF THE DRAWINGS

Other characteristics, objectives and advantages of the present invention are described in greater detail below, and with reference to the accompanying drawings which illustrate nonrestrictive embodiments, and in which:

FIGS. 1a, 1b and 1c are respectively schematic illustrations of a head-on view of a magnet structure containing a plurality of unitary magnets, an enlarged view of this magnet structure and a view in perspective of unitary magnets in the form of an elongated block according to a first embodiment of the present invention, the unitary magnets comprising at least a longitudinal end portion in an ovoid shape with inclined facets, FIGS. 2a, 2b and 2c are respectively schematic illustrations of a head-on view of a magnet structure containing a plurality of unitary magnets, an enlarged view of this magnet structure and a view in perspective of a unitary magnet in the form of an elongated block according to a second embodiment of the present invention, the unitary magnet comprising at least one longitudinal end portion in an ovoid shape with inclined facets, the inclined facets being rounded, FIGS. 3a, 3b and 3c are schematic representations respectively of a head-on view of a magnet structure containing a plurality of unitary magnets, an enlarged view of this magnet structure and a view in perspective of the unitary magnet in the form of an elongated block according to a third embodiment of the present invention, the unitary magnet having an essentially perfect ovoid shape with two rounded longitudinal and portions.

Figure 4:
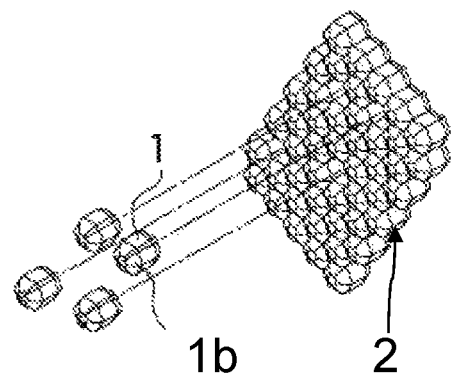
FIG. 4 is a schematic illustration of a view in perspective of a magnet structure according to the present invention containing unitary magnets according to the second embodiment, unitary magnets being shown separately from the magnet structure to increase visibility.

The figures are given by way of examples and are not restrictive of the invention, they constitute schematic illustrations designed to facilitate an understanding of the invention and are not necessarily drawings to scale of practical applications. In particular, the dimensions of the different parts are not representative of reality.

In the following, reference will be made to only a single unitary magnet, a single magnet structure, a single longitudinal facet, a single inclined facet and a single bevel for each type of bevel, however it must be understood that what is said with regard to one of these referenced elements is applicable to all similar elements.

To be transverse to the unitary magnet means to be in a plane perpendicular to a longitudinal axis of the elongated unitary magnet having the form of a block.

DETAILED DESCRIPTION OF THE INVENTIONS

With reference to all the figures and to FIGS. 1a to 1c, 2a to 2c and 3a to 3c in particular, the present invention relates to a unitary magnet 1 with an elongated shape that can be considered a block. "Elongated shape" means that its length is significantly greater than its width.

The unitary magnet 1 has a contour that is at least partly ovoid. The unitary magnet 1 comprises a first portion 1a forming a body of the unitary magnet 1 having a larger cross-section and extending over a greater length of the unitary magnet 1 than at least a second longitudinal end portion 1b pointing toward an associated longitudinal extremity of the magnet, whereby its cross-section decreases as it approaches the longitudinal extremity.

In FIG. 1c, the unitary magnet 1 comprises a single second end portion 1b. The first portion 1a and the second portion 1b of the unitary magnet 1 each comprise facets, longitudinal facets 3 for the first portion 1a and lateral facets 4 inclined toward the longitudinal extremity associated with the second portion 1b.

In FIG. 2c, the unitary magnet comprises two second end portions 1b respectively for a longitudinal extremity of the unitary magnet 1. The first portion 1a and second portion 1b of the unitary magnet 1 each comprise facets, longitudinal facets 3 for the first portion 1a and facets 4 inclined toward the associated longitudinal extremity on the respective second portion 1b. In this embodiment, the inclined facets are rounded.

In FIG. 3c, the unitary magnet 1 has an almost perfect ovoid shape with a first portion 1a and two second end portions 1b that are rounded and have a convex shape.

With reference in particular to FIGS. 2c and 3c, at least one second longitudinal end portion 1b can be rounded and have a convex shape, with or without inclined facets 4. A crown of the convex shape can form the associated longitudinal extremity. It can be considered that the second end portion 1b in FIG. 1c has a convex shape with reference to the edges of the inclined facets 4.

At least one second longitudinal end portion 1b has on its crown a median facet 5 forming the longitudinal extremity. This is the case in FIGS. 1c, 2c and 3c, although it is not mandatory.

As shown in FIGS. 1c and 2c, at least a second longitudinal end portion 1b can comprise lateral facets 4 inclined toward a longitudinal axis of the magnet approaching the associated longitudinal extremity of the magnet. The inclined lateral facets 4 can extend between a large base 4a connected to the first portion 1a forming the body of the magnet and a small base forming one longitudinal extremity of the magnet, the median facet 5 then forming the small base.

As shown in FIG. 2c, to somewhat more closely approximate an ovoid shape in spite of the presence of the inclined facets 4, the inclined lateral facets 4 can be rounded to give them a convex shape.

FIGS. 2c and 3c show two second longitudinal end portions 1b on a respective longitudinal extremity of the unitary magnet 1.

The first portion 1a forming the unitary magnet body 1 having a larger cross-section and extending over a greater length of the unitary magnet 1 can be rounded, having its largest cross-section toward a longitudinal median portion of the magnet and with a decreasing cross-section toward the longitudinal extremities of the magnet, to more closely approximate an ovoid shape. This is the case in FIG. 3c, although the case illustrated in FIG. 3c is not restrictive of this embodiment.

As shown in FIGS. 1c and 2c for a polygonal shape with facets, the first portion 1a forming the body of the unitary magnet 1 can be in the shape of a polygon having longitudinal facets 3. As an alternative, the first portion 1a can have a cylindrical shape with a circular or ovalized cross-section.

When the first portion 1a has longitudinal facets 3 and when one or both portions 1b have inclined facets 4, each of the inclined lateral facets 4 of the second portion or portions 1b is longitudinally extended on the unitary magnet 1 by a longitudinal facet 3 of the first portion 1a, one extremity of the inclined facet 4 of the second portion or portions 1b being placed end to end with one extremity of an associated longitudinal facet 3 of the first portion 1a.

With reference in particular to FIGS. 1a, 1b, 2a, 2b, 3a, 3b, 4 and 5, the invention relates to a magnet structure 2 in three dimensions constituted by a plurality of unitary magnets 1. The patterns created by the unitary magnets 1 are different depending on the design of these unitary magnets 1.

In this magnet structure 2, each unitary magnet 1 is of the type described above, the unitary magnets 1 being directly adjacent to one another and being partly in contact.

The unitary magnets 1 are adhesively connected by the deposition of adhesive on the areas of the unitary magnets 1 in contact. It follows that the plurality of unitary magnets 1 forms a mesh structure of unitary magnets 1 without the interposition of retaining elements between them other than the adhesive, for example cells that each hold a unitary magnet 1.

The unitary magnets 1 are in direct but partial contact between adjacent magnets. This is shown particularly clearly in FIG. 4 and in the enlarged FIGS. 1b, 2b and 3b.

In one preferred embodiment of the present invention, the areas of the unitary magnets 1 in contact can have beveled edges 6, 6a hollowed out in an exterior contour of each unitary magnet 1 in contact with another unitary magnet 1, the adhesive being deposited exclusively on the beveled edges 6, 6a of the unitary magnets 1.

The beveled edges 6 can be located on each of the ridges of the longitudinal facets 3 when present, located on the almost spot contact between two perfectly ovoid unitary magnets 1, or the beveled edges can be located on the large base 4a of the second portion 1b when the second portion 1b comprises inclined facets 4, which can be rounded or not.

Figure 5:
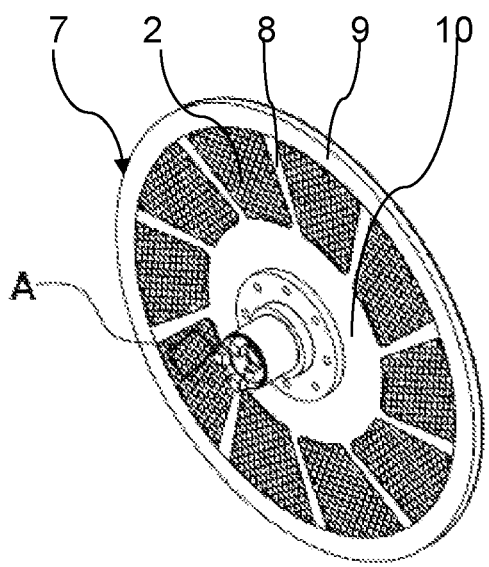
FIG. 5 is a schematic illustration of a view in perspective of a rotor comprising a plurality of magnet structures, the rotor being part of an electromagnetic actuator according to the present invention, the portion A inside the frame in this figure making reference to FIG. 4.

With particular reference to FIG. 5, the invention further relates to a linear or rotary electromagnetic actuator comprising a magnet structure 2 or a plurality of magnet structures 2 of the type described above where the magnet structure or structures 2 are part of a rotor 7 that rotates around its center as shown in FIG. 5 for an axial flux actuator. The magnet structure or structures 2 are arranged concentrically with respect to the center of the rotor 7, advantageously separated by branches 8 when there are a plurality of magnet structures 2 and framed on one hand by a hub 10 and a binding band 9. The branches 8 extend from the hub 10 and end at the binding band 9 that forms the external periphery of the rotor 7.

The actuator illustrated in FIG. 5 is an axial flux actuator but can also be a radial flux actuator.

When unitary, the magnet structure 2 can form a single magnet that extends over the actuator. When multiple, as illustrated in FIG. 5, the magnet structures 2 are successive blocks forming alternating successive magnetic poles.

Finally, the invention relates to a method for the fabrication of a magnet structure 2 of the type described above. The method comprises a step of cutting out from a magnetized tile having a length, a width and a thickness forming the three dimensions of the tile a plurality of unitary magnets 1 according to the three dimensions of the magnetized tile, the unitary magnets 1 having at least partly an ovoid shape.

The method then comprises a step of determining areas of partial contact on each unitary magnet 1 with each magnet that is adjacent to it when the magnets are adjacent to one another. The partial contact areas are a function of the external contour of the unitary magnets 1.

The next step is the adhesive connection of each unitary magnet 1 by the application of a resin for each unitary magnet 1 only on the determined partial contact areas.

The unitary magnets 1 are then positioned and adhesively connected in an adjacent matter to one another, partial contact between two adjacent unitary magnets 1 being established in the contact areas.

A layer of composite can be injected around the unitary magnets 1 thus placed in contact and adhesively fastened to coat them and increase the density of the magnet structure 2 thus created.

The invention claimed is:

1. Magnet structure (2) in three dimensions comprising:
   a plurality of unitary magnets (1), characterized in that the unitary magnets (1) have an elongated shape in the form of an ellipsoid of revolution or polygon,
   each unitary magnet (1) comprising a first portion (1a) forming the body of the unitary magnet (1) having a larger cross-section and extending over a greater length of the unitary magnet (1) than at least one second longitudinal end portion (1*b*) pointing toward an associated longitudinal extremity of the magnets (1), with a decreasing cross-section approaching the longitudinal extremity, the unitary magnets (1) being directly adjacent to one another and being partly in contact, the magnets (1) being adhesively connected by the deposition of adhesive on the areas of unitary magnets (1) in contact, the plurality of unitary magnets (1) creating a mesh structure of magnets without the interposition of retention elements other than the adhesive between them.

2. The magnet structure (2) according to claim 1, in which the at least one second longitudinal extremity portion (1*b*) is rounded, having a convex shape, a crown of the convex shape forming the associated longitudinal extremity.

3. The magnet structure (2) according to claim 1, in which the at least one second longitudinal end portion (1*b*) has on its crown a median facet (5) forming the longitudinal extremity.

4. The magnet structure (2) according to claim 1, in which the at least one second longitudinal end portion (1*b*) comprises lateral facets (4) inclined toward a longitudinal axis of the magnet (1) approaching the associated longitudinal extremity of the magnet, the inclined lateral facets (4) extending between a large base (4*a*) connected to the first portion (1*a*) forming the body of the magnet and a small base forming a longitudinal extremity of the magnet.

5. The magnet structure (2) according to claim 1, in which the inclined lateral facets (4) are rounded to be convex.

6. The magnet structure (2) according to claim 1, in which each longitudinal end portion of the magnet comprises a second longitudinal end portion (1*b*).

7. The magnet structure (2) according to claim 1, in which the first portion (1*a*) forming the body of the unitary magnet (1) having a larger cross-section and extending over a greater length of the unitary magnet (1) is rounded, having its largest cross-section toward a longitudinal median portion of the magnet (1) and decreasing in cross-section toward the longitudinal extremities of the magnet (1).

8. The magnet structure (2) according to claim 1, in which the first portion (1*a*) forming the body of the unitary magnet (1) is in the shape of a polygon with longitudinal facets (3).

9. The magnet structure (2) according to claim 8 in which the first portion (1*a*) having the longitudinal facets (3), each of the inclined lateral facets (4) of the at least one second portion (1*b*) are longitudinally extended on the unitary magnet (1) by a longitudinal facet (3) of the first portion (1*a*).

10. The magnet structure (2) according to claim 1 in which the areas of the unitary magnets (1) in contact have beveled edges (6, 6*a*) rounded into an exterior contour of each unitary magnet (1) in contact with another unitary magnet (1), adhesive being deposited exclusively on the beveled edges (6, 6*a*) of the unitary magnets (1).

11. A linear or rotary electromagnetic actuator, characterized in that it comprises a magnet structure (2) or a plurality of magnet structures (2) according to claim 1, the magnet structure or structures (2) being part of a rotor (7) that rotates around its center, the magnet structure or structures (2) being arranged concentrically around the center of the rotor (7).

12. An electromagnetic actuator according to claim 11, in which, when unitary, the magnet structure (2) forms a single magnet extending over the actuator or, when multiple, the magnet structures (2) are successive blocks forming successive alternating magnetic poles.

13. A method for the fabrication of a magnet structure (2) according to claim 1, characterized in that it comprises the following steps:

cutting out from a magnetized tile having a length, a width and a thickness forming three dimensions of the tile a plurality of unitary magnets (1) according to the three dimensions of the magnetized tile, the unitary magnets having at least partly an ovoid shape, determination of partial contact areas on each unitary magnet (1) with each magnet that is adjacent to it when the magnets are adjacent to one another, adhesive connection of each unitary magnet (1) by deposition of a resin for each unitary magnet (1) only in determined partial contact areas, and positioning of the unitary magnets (1) thus adhesively connected adjacent to one another, a partial contact between two adjacent unitary magnets (1) being established in the contact areas.

14. The method according to claim 13, in which a layer of composite is injected around the unitary magnets (1) thus placed in contact and adhesively connected for their coating.

15. The magnet structure (2) according to claim 1, in which the first portion (1*a*) forming the body of the unitary magnet (1) in the shape of a cylinder with a circular or ovalized cross-section.

* * * * *